(No Model.)
W. C. HARRIS.
FRICTION CLUTCH.
No. 577,252. Patented Feb. 16, 1897.
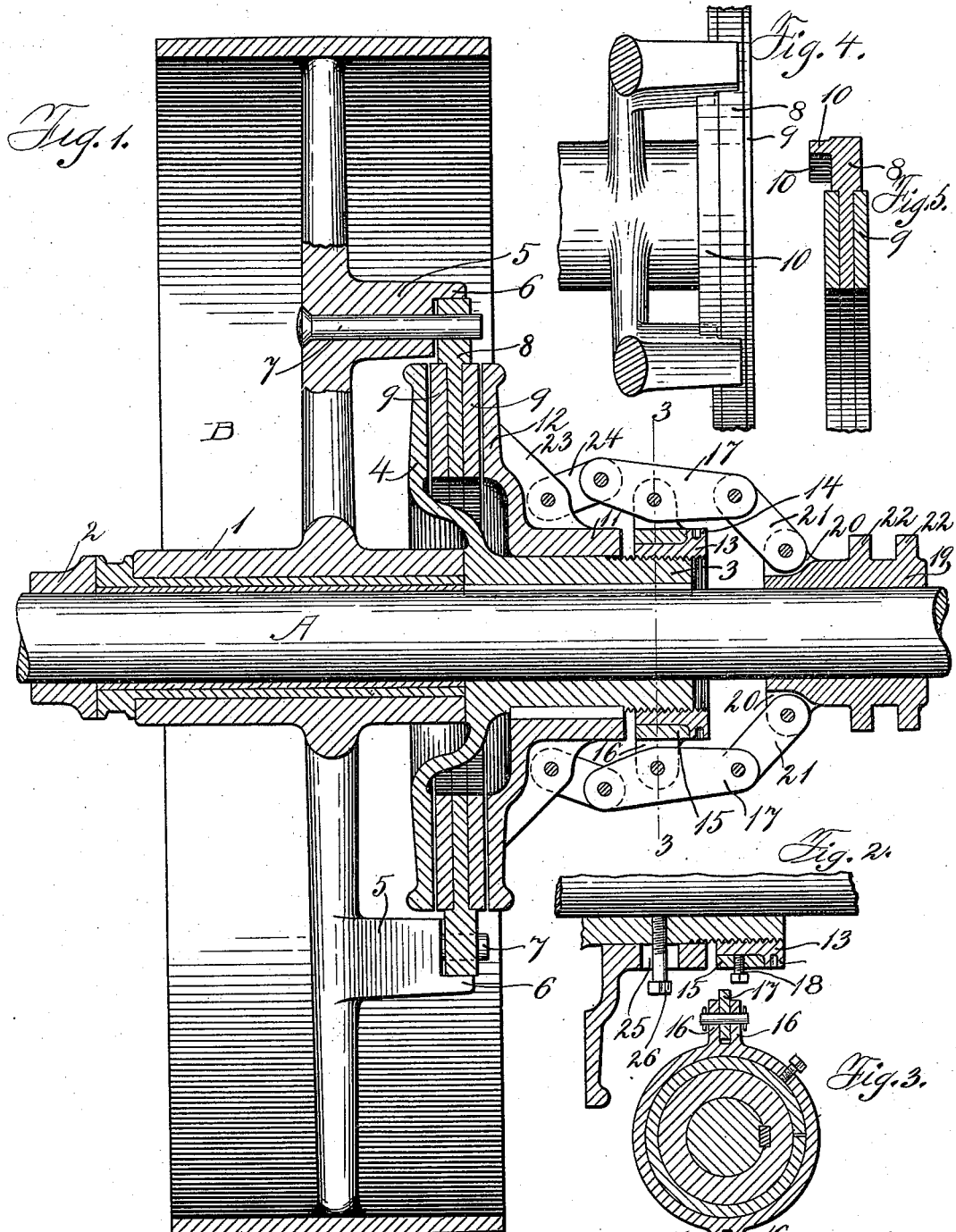
Witnesses:
Art E. Reinke
E. J. Orleau
Inventor:
William C. Harris
By Rudolph Wm. Lotz
Att'y.

UNITED STATES PATENT OFFICE.

WILLIAM C. HARRIS, OF CHICAGO, ILLINOIS, ASSIGNOR TO THE A. PLAMONDON MANUFACTURING COMPANY, OF SAME PLACE.

FRICTION-CLUTCH.

SPECIFICATION forming part of Letters Patent No. 577,252, dated February 16, 1897.

Application filed July 27, 1896. Serial No. 600,677. (No model.)

*To all whom it may concern:*

Be it known that I, WILLIAM C. HARRIS, a citizen of the United States, residing at Chicago, in the county of Cook and State of Illinois, have invented certain new and useful Improvements in Friction-Clutches; and I do hereby declare the following to be a full, clear, and exact description of the invention, such as will enable others skilled in the art to which it appertains to make and use the same.

This invention relates to a novel construction in a friction-clutch, the object being to provide a device of this description of simple and durable construction and efficient operation; and it consists in the features of construction and combinations of parts hereinafter fully described and claimed.

In the accompanying drawings, illustrating my invention, Figure 1 is a central longitudinal section of a friction-clutch constructed in accordance with my invention. Fig. 2 is a fragmentary section taken at an angle of about forty-five degrees from the section shown in Fig. 1. Fig. 3 is a detail sectional view taken on the line 3 3 of Fig. 1. Figs. 4 and 5 are detail views.

Referring now to said drawings, A indicates a shaft upon which the pulley B is loosely mounted. The hub 1 of said pulley is held upon said shaft A between a collar 2 and the hub 3 of the clutch member 4. Said pulley B is provided on its spokes equidistant from its center with a plurality of outwardly-extending lugs or projections 5, provided with flanges 6 at their upper edges. Pins 7, which project outwardly inwardly of said flanges 6, are rigidly mounted in said lugs 5 and extend, preferably, beyond said flanges 6. Loosely mounted upon said pins 7 is a clutch-ring 8, which may be termed the "member to be clutched," which is provided on both faces with blocks 9, of wood or any other suitable material having frictional surface. Such clutch-ring 8 is adapted to fit within said flanges 6 and is provided with openings adapted to receive said pins 7. In Figs. 4 and 5 I have shown another manner in which said clutch-ring 8 may be mounted upon said pulley B, which consists in providing flanges 10 on said clutch-ring, which are adapted to fit between and engage the adjacent faces of two adjacent lugs 5. In this construction the pins 7 are obviously dispensed with. Mounted upon said hub 3 of said clutch member 4 is the hub 11 of the clutch member 12. Said hub 11 is keyed upon said hub 3 and is longitudinally movable thereon, and said hub 3 keyed upon said shaft A and immovable thereon. The outer end of said hub 3 is screw-threaded, and mounted upon said screw-threaded portion thereof is a screw-threaded split nut or ring 13, which is provided at its outer end with a circumferential flange or collar 14. Mounted upon said split nut or ring 13 is a collar 15, provided, preferably, with two pairs of parallel outwardly-extending lugs or projections 16, between which the rocking levers 17 are pivotally mounted at about their middle portions. Said collar 15 is rigidly held upon said split nut or ring 13 by means of a set-screw 18, which serves also to clamp said split nut 13 upon said hub 3.

A collar 19, provided at one end with outwardly-extending parallel lugs or projections 20, between which the links 21 are pivoted, is loosely mounted upon said shaft and is longitudinally movable thereon. Said collar is provided at its other end with two circumferential flanges 22, between which the lugs of the fork of a suitable operating-lever are adapted to fit. I have not shown this lever, as it is a well-known construction. Said links 22 are pivoted at their other ends to the outer ends of said rocking levers 17 and incline outwardly toward the same. Said clutch member 12 is also provided with parallel lugs or projections 23, between which links 24, pivotally secured at their other ends to the inner ends of said rocking levers 17, are pivoted. Said links 24 incline inwardly from said rocking levers 17 to their pivots. In the drawings I have shown said clutch members released. To clutch said member 8 between said members 4 and 12, said collar 19 is moved toward said pulley B, thereby obviously throwing the outer ends of the rocking levers 17 upwardly, thus depressing their inner ends and the outer ends of the links 24, whereby said member 12 will be moved into engagement with said member 8 and force the same into engagement with said member 4, thus firmly clamping it between said members 4 and 12. As the clutch-faces 9 become worn said members are adjusted to take up such wear by means of said split nut 13, and the degree of pressure to be exerted upon said member 8 is also adjusted thereby.

The loose clutch member 8 which I employ is particularly advantageous, inasmuch as it is light and will of its own accord leave said members 4 and 12 without the aid of springs, thus at all times insuring thoroughly reliable action. This feature makes this clutch particularly adaptable for high speeds.

In Fig. 2 I have shown a slight modification, which consists in cutting a slot 25 in said hub 11 of the clutch member 12, through which a set-screw 26 passes into the hub 3 of the clutch member 4 and engages the shaft A, thus providing a sliding connection between said members 4 and 12 and at the same time providing a means for holding said hub 3 rigidly upon the shaft A.

This clutch is now one of the cheapest and most durable and efficient devices on the market at the present time and is meeting with great success.

I do not of course desire to be limited to my device as adapted to a pulley as herein shown and described, as it can obviously be applied in many other ways without departing from the spirit of my invention.

I claim as my invention—

In a friction-clutch, the combination with a part to be clutched and carrying a clutch member comprising a ring loosely mounted thereon, and longitudinally movable with relation thereto, of a shaft carrying two clutch members between which said loose ring is located, one of said members comprising a hub rigidly mounted upon said shaft and provided with an outwardly-extending flange adapted to engage the inner face of said ring, a sliding sleeve on said hub provided with an outwardly-extending circumferential flange adapted to engage the outer face of said ring, an adjustable split nut upon the hub of said inner clutch member, a ring mounted upon said split nut and adapted to be clamped thereon, toggle-levers pivotally mounted upon said ring, links pivotally secured at one end to said toggle-levers and at their other ends to said outer clutch member, a sliding sleeve on said shaft, and links pivotally connected at one end with said sliding sleeves and at their other ends with the outer ends of said toggle-levers.

In testimony whereof I affix my signature in presence of two witnesses.

WILLIAM C. HARRIS.

Witnesses:
RUDOLPH WM. LOTZ,
E. J. BOILEAU.